United States Patent

Ishii et al.

[11] Patent Number: 6,064,323
[45] Date of Patent: *May 16, 2000

[54] NAVIGATION APPARATUS, NAVIGATION METHOD AND AUTOMOTIVE VEHICLES

[75] Inventors: Kazuo Ishii, Kanagawa; Eiji Yamamoto, Saitama; Miyuki Tanaka, Tokyo; Hiroshi Kakuda; Yasuharu Asano, both of Kanagawa; Hiroaki Ogawa, Tokyo; Masanori Omote, Kanagawa; Katsuki Minamino, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/728,914

[22] Filed: Oct. 11, 1996

[30] Foreign Application Priority Data

Oct. 16, 1995 [JP] Japan .................................. 7-267545

[51] Int. Cl.$^7$ .................................................. G08G 1/123
[52] U.S. Cl. ........................... 340/995; 340/990; 701/209; 701/211
[58] Field of Search ..................... 340/995, 990, 340/988; 364/449.2, 449.3; 701/208, 209, 211, 210

[56] References Cited

U.S. PATENT DOCUMENTS

| | | | |
|---|---|---|---|
| 4,758,959 | 7/1988 | Thoone et al. | 340/990 |
| 5,177,685 | 1/1993 | Davis et al. | 340/988 |
| 5,220,507 | 6/1993 | Kirson | 340/995 |
| 5,274,560 | 12/1993 | LaRue | 340/988 |
| 5,521,635 | 5/1996 | Mitsuhashi et al. | 381/110 |
| 5,544,060 | 8/1996 | Fujii et al. | 340/995 |
| 5,610,821 | 3/1997 | Gazis et al. | 340/995 |
| 5,648,768 | 7/1997 | Bouve | 340/995 |
| 5,754,430 | 5/1998 | Sawada | 340/990 |

OTHER PUBLICATIONS

Japanese Published Patent Appln. 3–175478, Jul. 1991.
Japanese Published Patent Appln. 6–274190, Sep. 1994.

*Primary Examiner*—Brent A. Swarthout
*Attorney, Agent, or Firm*—Jay H. Maioli

[57] ABSTRACT

A navigation apparatus and navigation method for an automobile in which a map is visually displayed and a desired destination can be set by speaking the name of such destination. A voice recognition section recognizes the destination and marks it on the map that is being displayed and the best route to the displayed destination is then shown on the map to be followed by the driver of the automobile.

15 Claims, 9 Drawing Sheets

FIG. 4

| Prefecture | Other Municipalities Names | Phonemic Model |
|---|---|---|
| Hokkaido | Akabira City<br>Asahikawa City<br>⋮ | |
| Aomori Prefecture | Aomori city<br>⋮ | |
| Kanagawa Prefecture | Ooiso Town<br>Ooiso-Cho | |
| Kanagawa Prefecture | Kawasaki City | |
| Tokyo | Kawasaki City | |

⋮

| What time is it now?<br>Present Time<br>Time | |
|---|---|

FIG. 5

| Prefecture | Other Municipalities Names | Longitude | Latitude | Display Scale |
|---|---|---|---|---|
| Hokkaido | Akabira City Asahikawa City --------- | | | |

NAVIGATION APPARATUS, NAVIGATION METHOD AND AUTOMOTIVE VEHICLES

BACKGROUND OF THE INVENTION

1. Field of the Invention

The present invention relates to a navigation apparatus suitably mounted on an automotive vehicle for displaying a road map or the like, a navigation method and an automotive vehicle having such a navigation apparatus mounted thereon.

2. Description of the Prior Art

Various types of navigation apparatuses for use on an automotive vehicle are under development. The navigation apparatus comprises, for example, a large-capacity storage means such as a CD-ROM storing road map data, means for detecting the present position, and a display unit for displaying the road map of the neighborhood of the detected present position on the basis of the data read from the data storage means. The present position detection means includes a positioning system using a positioning earth satellite called the GPS (Global Positioning System) or a device operated using a self-contained navigation method by tracking the change in the present position from the starting point on the basis of the information including the vehicle running speed and the direction in which the vehicle is running.

Also, the map of the desired position as well as the neighborhood of the present position can be displayed on the display unit by key operation as far as the associated map data are available.

In this navigation apparatus for use on automotive vehicles, for example, the display unit is generally mounted in the vicinity of the driver's seat so that the driver can check the map of the neighborhood of the present position while the vehicle is running or waiting for a traffic signal.

The above-mentioned navigation apparatus is required to be operated in a manner not to interfere with the operation of the vehicle on which the apparatus is mounted. While the vehicle is moving, for example, complex operations of the navigation apparatus are prohibited. In other words, this navigation apparatus, when installed on the vehicle, is connected with a running condition detector (such as a parking brake switch). In this way, the apparatus can be fully operated only when the detector finds that the vehicle is stationary, and a complicated key operation is prohibited while the vehicle is not stationary (i.e., when the vehicle is moving).

It is, however, inconvenient that the key operation is impossible for switching the display map while the vehicle is moving. Demand is high, therefore, for a navigation apparatus that can be manipulated in sophisticated manner without interfering with the vehicle operation.

SUMMARY OF THE INVENTION

In view of these points, the object of the present invention is to provide a navigation apparatus that facilitates a sophisticated operation of various devices including the navigation apparatus without interfering with the vehicle operation.

BRIEF DESCRIPTION OF THE DRAWINGS

FIG. 2 is a perspective view showing the vicinity of the driver's seat of an automotive vehicle into which the apparatus according to an embodiment is built in.

FIG. 4 is a diagram for explaining a storage area configuration of a voice recognition memory according to an embodiment.

FIG. 5 is a diagram for explaining a storage area configuration of a latitude/longitude conversion memory according to an embodiment.

FIG. 9 including

DESCRIPTION OF THE PREFERRED EMBODIMENTS

An embodiment of the present invention will be described with reference to the accompanying drawings.

Figure 1:
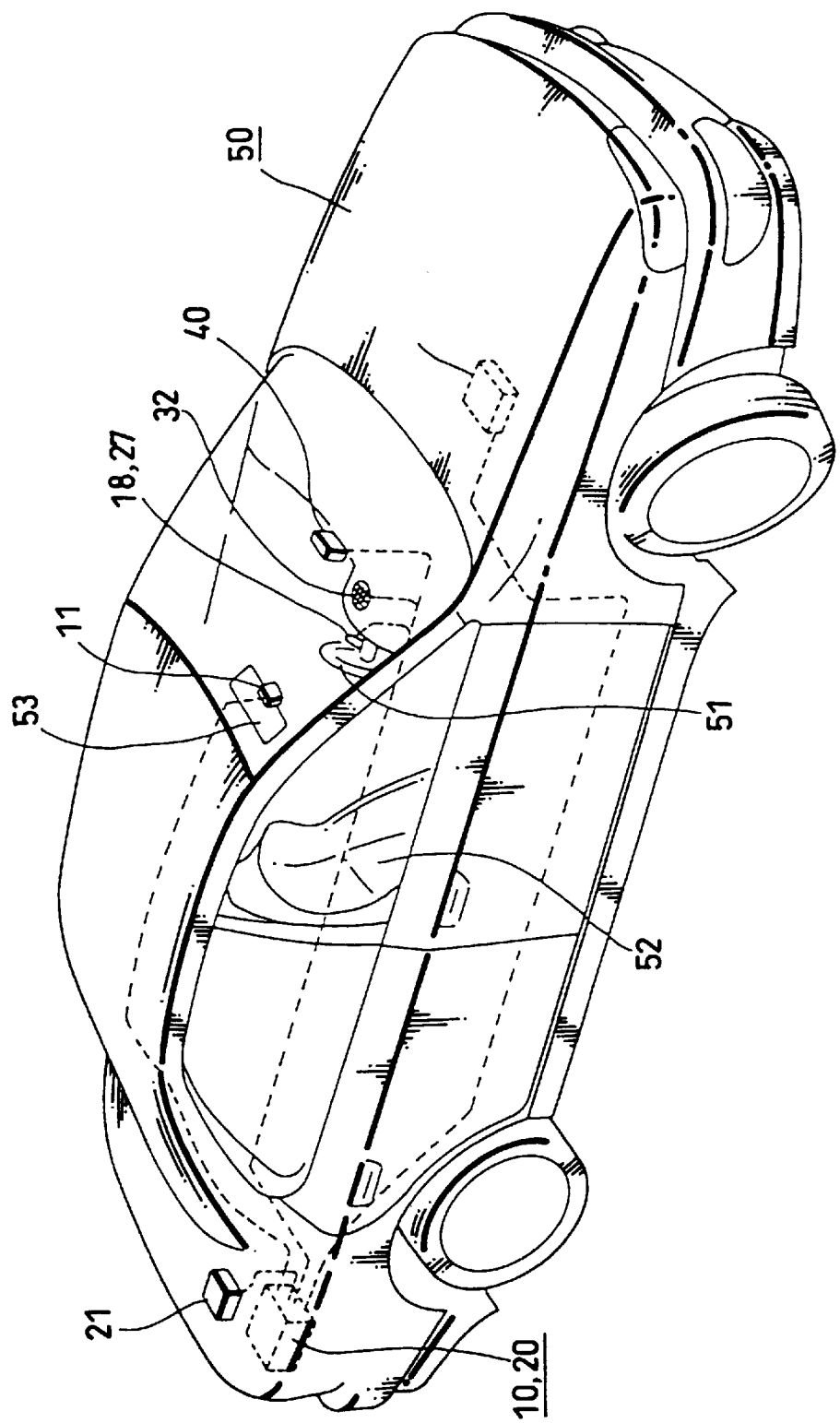
FIG. 1 is a perspective view showing the apparatus according to an embodiment built in an automotive vehicle.
Figure 2:
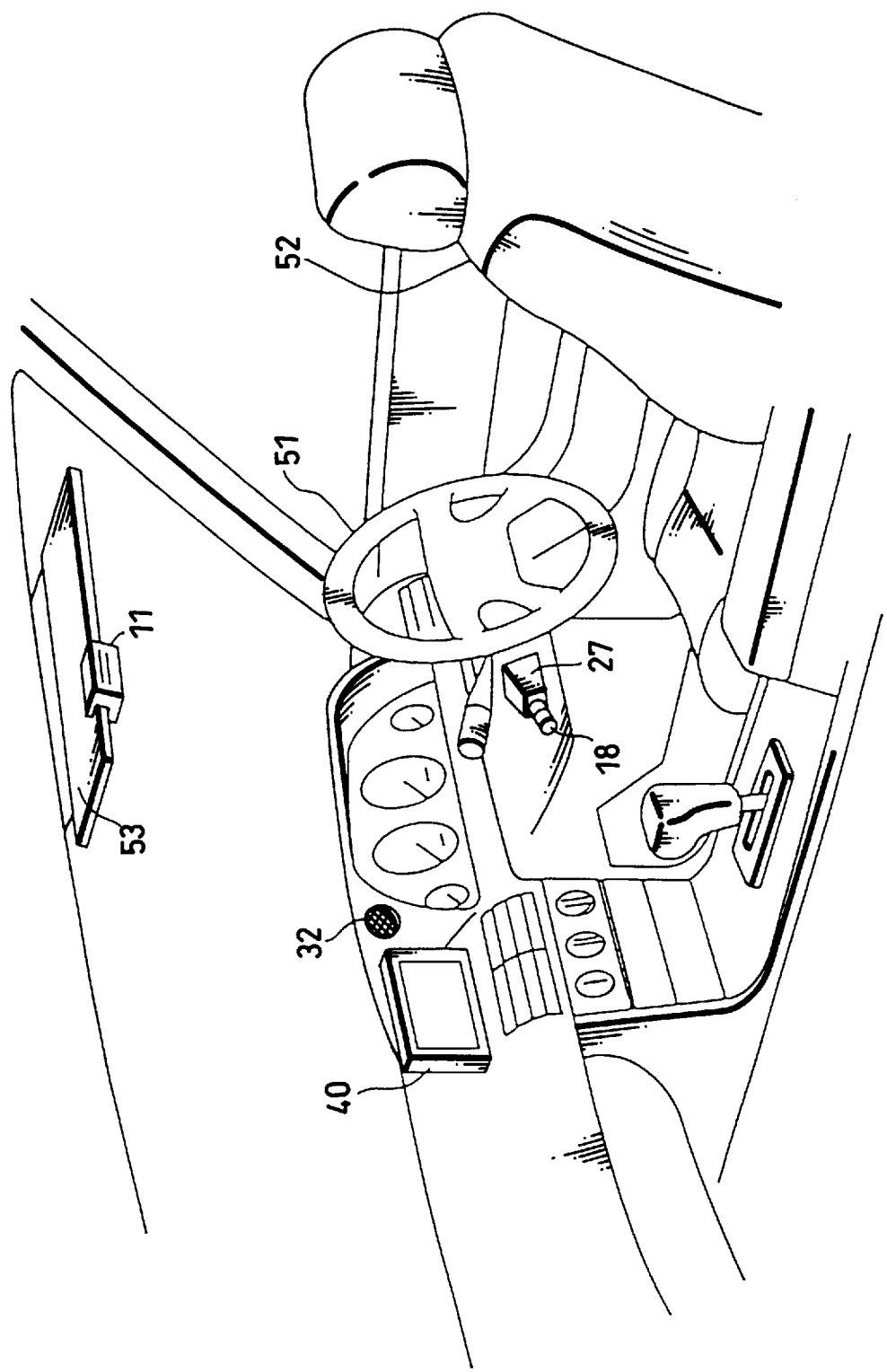

This embodiment is applied to a navigation apparatus mounted on an automotive vehicle. The manner in which the apparatus according to this embodiment is mounted on the vehicle will be explained with reference to FIGS. 1 and 2. As shown in FIG. 2, an automotive vehicle 50 has a steering wheel 51 mounted on the front of a driver's seat 52. Basically, the driver seated in the seat 52 operates the navigation apparatus. Other occupants of the vehicle 50, however, may operate the navigation apparatus. A navigation apparatus body 20 and a voice recognition unit 10 connected to the navigation apparatus body 20 are installed in an arbitrary space (in the rear trunk, for example) in the vehicle 50, and a positioning signal-receiving antenna 21 is mounted outside of the vehicle body (or in the vehicle inside of the rear window) as described later.

As seen from FIG. 2, which shows the neighborhood of the driver's seat, a talk switch 18 and an operating key 27 for the navigation apparatus are arranged beside the steering wheel 51. The switch and keys are so arranged as not to interfere with the operation of the vehicle while running. Also, a display unit 40 connected with the navigation apparatus is arranged in such a position as not to interfere with the forward field of view of the driver. A speaker 32 for outputting a voice signal synthesized in the navigation apparatus 20 is mounted at such a position (beside the display unit 40, for example) that the output voice can reach the driver.

Further, the navigation apparatus according to this embodiment is so constructed as to accept a voice input. For this purpose, a microphone 11 is mounted on a sun visor 53 arranged in the upper part of the windshield in a way to pick up the speech of the driver seated in the driver's seat 52.

Also, the navigation apparatus body 20 according to this embodiment is connected with an engine control computer 54 of the automotive vehicle, which supplies a pulse signal proportional to the vehicle speed.

Figure 3:
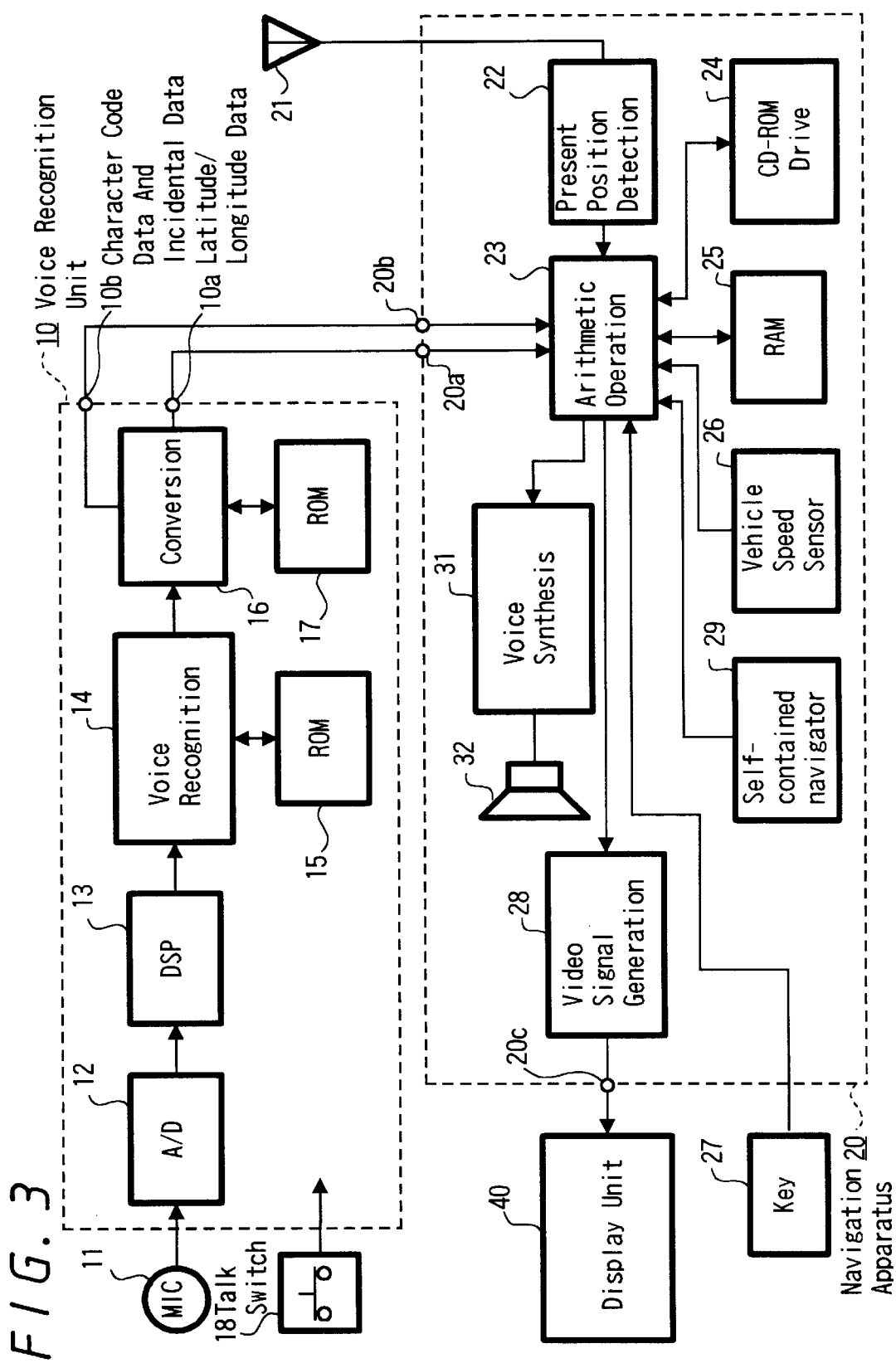
FIG. 3 is a diagram showing a configuration according to an embodiment of the invention.

Now, the internal configuration of the navigation apparatus will be explained with reference to FIG. 3. In this embodiment, the voice recognition unit 10, which is connected with the navigation apparatus 20, is also connected with the microphone 11. This microphone 11 preferably has a comparatively narrow directivity to pick up only the speech of the person seated in the driver's seat.

The voice signal picked up by the microphone 11 is supplied to an analog/digital converter 12, where it is sampled with a signal of a predetermined sampling frequency and converted into a digital signal. The digital voice signal output from the analog/digital converter 12 is applied to a digital voice processing circuit 13 including an integrated circuit called a DSP (Digital Signal Processor). The digital voice processing circuit 13 supplies the digital voice signal as vector data to the voice recognition circuit 14 by such means as bandwidth division or filtering.

This voice recognition circuit 14 is connected with a voice recognition data storage ROM 15 and performs the recognition operation in accordance with a predetermined voice recognition algorithm (such as HMM or Hidden Markov Model). A plurality of candidates are thus selected from the voice recognition phonemic models stored in the ROM 15, and the character data corresponding to the most coincident phonemic model among the candidates is read out.

Explanation will now be made about the data storage condition of the voice recognition data storage ROM 15. According to this embodiment, only the place names and the words are recognized for giving instructions to operate the navigation apparatus. As shown by the setting of the storage area in FIG. 4, the place names registered include only the names of the prefectures and other municipalities (cities, wards, towns and villages) in Japan. In addition, character codes of the place names and phonemic models providing data for voice recognition of the place names are stored for each pair of prefecture and municipality.

In Japan, for example, there are about 3500 municipalities over the whole country, and therefore about 3500 place names are stored. In the case of a town which is pronounced one of two ways "Machi" and "Cho", however, two types of data including "xx Cho" and "xx Machi" are stored. In similar fashion, for the place name of a village which is also pronounced one of two ways "Son" and "Mura", two types of names, i.e., "xx Son" and "xx Mura", are stored for each of such villages.

Also, as regards the municipalities located adjacent to a boundary of a prefecture the name of which is liable to be called by the wrong name, the prefectural name often mistaken for it is additionally registered. The city of "Kawasaki, Kanagawa Prefecture", for example, is registered also as "Kawasaki, Tokyo" including the name of the adjacent prefecture.

Further, various character codes of words representing operating instructions to the navigation apparatus and corresponding phonemic models are stored. The words include those indicating a display position such as "destination", "starting point", "intermediate place", "residence", and those for giving various operating instructions such as "What time is it now?" (a command asking about the present time), "Where are we now?" (a command asking about the present position), "What is the next" (a command asking about the next intersection), "How long to go?" (a command asking about the remaining distance to the destination), "What is the speed" (a command asking about the current speed), "What is the altitude" (a command asking about the altitude), "Which direction should we take?" (a command asking about the direction in which to run), and "Command list" (a command for displaying a list of recognizable commands).

In the case where a character code corresponding to a phonemic model coinciding with the recognition obtained through a predetermined voice recognition algorithm from an input vector data through the voice recognition circuit 14 represents a place name, then the particular character code is read from the ROM 15. The character code thus read is applied to a converter circuit 16. The converter circuit 16 is connected with a conversion data storage ROM 17, so that the longitude/latitude data and incidental data associated with the character data supplied from the voice recognition circuit 14 are read out of the ROM 17.

Now, explanation will be made about the data storage condition of the conversion data storage ROM 17 according to this embodiment. In this embodiment, a storage area is set for each character code identical to that of the place name stored in the voice recognition data storage ROM 15. As shown in FIG. 5, the latitude/longitude data and display scale data as incidental data of each place name are stored for each character code representing a place name. Unlike the character code read from the voice recognition data storage ROM 15 that is expressed in katakana, the latitude/longitude conversion data storage ROM 17 has also stored therein character codes for display in kanji, hiragana and katakana, in addition to character codes of katakana.

According to the present embodiment, the latitude/longitude data of each place name represents the absolute position of a municipal office (such as city office, ward office, town office or village office) of the area indicated by the particular place name. Also, the incidental data which are output together with the latitude/longitude data include the display character code and the display scale. The display scale data are set in several levels, for example, according to the size of the area indicated by each place name.

The latitude/longitude data and the incidental data read from the latitude/longitude conversion data storage ROM 17 are applied to output terminals 10a, 10b as an output of the voice recognition unit 10. The data produced at the output terminals 10a, 10b are applied to the navigation apparatus 20. The voice recognition unit 10 according to this embodiment includes a talk switch 18 adapted to open and close in unlocked state (that is to say, turned on only as long as depressed). While this talk switch 18 is depressed, only the voice signal picked up by the microphone 11 is processed as described above by the circuits all the way from the analog/digital converter 12 to the latitude/longitude conversion circuit 16.

Now, explanation will be made about a configuration of the navigation apparatus 20 connected with the voice recognition unit 10. The navigation apparatus 20 comprises a GPS antenna 21. The positioning signal received from a GPS satellite by the antenna 21 is processed by a present position detecting circuit 22. The data thus received is analyzed to detect the present position. The present position data thus detected include the latitude/longitude data providing the prevailing absolute position.

The present position data thus detected are applied to an arithmetic circuit 23. The arithmetic circuit 23 functions as a system controller for controlling the operation of the navigation apparatus 20. The arithmetic circuit 23, in which a CD-ROM (optical disk) for storing the road map data is set, is connected with a CD-ROM driver 23 for reading the data stored in the CD-ROM, a RAM 25 for storing various data required for data processing, a vehicle speed sensor 26 for detecting the behavior of the vehicle on which the navigation apparatus is mounted, and an operating key 27. In the case where the latitude/longitude coordinate data including the present position is obtained, the CD-ROM drive 24 is controlled to read the road map data of the neighborhood of the position represented by the coordinate. The road map data read by the CD-ROM driver 24 is temporarily stored in the RAM 25. Display data for displaying the road map is produced by use of the road map data thus stored. In the process, the map is displayed from the display data in a scale set by the operation of the key 27 arranged at a predetermined position in the vehicle.

The display data produced by the arithmetic circuit 23 are applied to a video signal producing circuit 28, which generates a video signal of a predetermined format on the basis of the display data. The resulting video signal is applied to an output terminal 20c.

The video signal output from the output terminal 20c is applied to a display unit 40. The display unit 40 performs the receiving process on the basis of the video signal and causes the road map or the like to be displayed on the display panel of the display unit 40.

In addition to the road map of the neighborhood of the present position, the road map of an arbitrary position designated by the operation of the key 27 can also be displayed under the control of the arithmetic circuit 23. Also, specific coordinate positions representing "destination", "starting point", "intermediate place" and "residence" can be registered by the operation of the key 27. In the case where a specific coordinate position is registered, the coordinate position data thus registered (latitude/longitude data) are stored in the RAM 25.

Also, in the case where the vehicle speed sensor 26 detects that the vehicle is running, the arithmetic circuit 23 rejects the operation of the key 27 except for comparatively minor ones.

The navigation apparatus 20 also comprises a self-contained navigator 29 for computing the running speed of the vehicle accurately on the basis of a pulse signal corresponding to the vehicle speed supplied from an automotive engine control computer or the like, detecting the direction in which the vehicle is running on the basis of the output of a gyro sensor in the self-contained navigator 29, and measuring the present position autonomously from a position determined by the speed and the running direction. Under the circumstances where the present position is incapable of being detected by the present position detection circuit 22, for example, the present position is measured by the self-contained navigation method from the position last detected by the present position detection circuit 22.

The arithmetic circuit 23 is also connected with a voice synthesis circuit 31. In the case where the arithmetic circuit 23 is required to issue some instruction by voice, the voice synthesis circuit 31 is caused to synthesize the voice for the instruction and to produce the voice from a speaker 32 connected to the voice synthesis circuit 31. The voice instructions include, for example, "We are approaching the destination", "You should proceed to the right", etc. These and various other instructions are issued by voice as required as a navigation apparatus. Also, the voice synthesis circuit 31 synthesizes the voice recognized by the voice recognition unit 10 on the basis of the character data supplied thereto, and output the synthesized voice from the speaker 32. This process will be described later.

The navigation apparatus 20 comprises input terminals 20a, 20b supplied with the character code, latitude/longitude data and data incidental thereto output from the output terminals 10a, 10b of the voice recognition unit 10. These latitude/longitude data, data incidental thereto and the character code data produced from the input terminals 20a, 20b are applied to the arithmetic circuit 23. The arithmetic circuit 23, when supplied with the latitude/longitude and other data from the voice recognition unit 10, controls the CD-ROM driver 24 to read the road map data of the neighborhood of the particular latitude/longitude from the disk. The road map data read by the CD-ROM driver 24 are temporarily stored in the RAM 25. By use of the road map data thus stored, display data for displaying the road map are produced. The display data thus produced are used to display the map around the supplied latitude and longitude in the designated display scale incidental to the latitude/longitude data.

On the basis of this display data, the video signal producing circuit 28 generates a video signal, and the display unit 40 is caused to display the road map of the coordinate point designated by the voice recognition unit 10.

In the case where a character code representing a verbal instruction for operating the navigation apparatus is supplied from the output terminal 10b of the voice recognition unit 10, the arithmetic circuit 23 identifies the verbal character code and performs related control operations. Assume that the verbal character code specifies a display position such as "destination", "starting point", "intermediate place" or "residence". It is decided whether the coordinate of the display position is registered in the RAM 25 or not. If it is registered so, the road map data of the neighborhood of the particular position is read from the disk by the CD-ROM driver 24.

Also, when registering the display position of "destination", "starting point", "intermediate place" or "residence", the voice of, say, "register destination" can be recognized and set. When an instruction is given for registration of any of these display positions, the cursor position (indicated by a mark at an arbitrary position in the map by a predetermined operation of the key 27) on the map displayed on the display unit 40 is registered. The arithmetic circuit 23 according to this embodiment is adapted to automatically set the route up to the position of a destination or an intermediate place which may be registered. More specifically, what is considered the most appropriate route from the position registered as the residence or the present position detected by the present position detecting circuit 22 up to the destination or the intermediate place is determined automatically by arithmetic operations. In the case where information on traffic jam or other road conditions is available from an external source, however, the route can be set taking such information into account.

On the other hand, assume that a character code data indicating the pronunciation of a recognized voice is supplied to the arithmetic circuit 23 from the voice recognition unit 10. The words represented by the character code are synthesized by the voice synthesis circuit 31 and output as a voice from the speaker 32 connected with the voice synthesis circuit 31. Suppose the voice recognition unit 10 recognizes the voice as "Bunkyo Ward, Tokyo", for example, the voice synthesis circuit 31 performs synthesis in a manner to generate a voice signal pronounced "Bunkyo Ward, Tokyo" on the basis of the character string data of the pronunciation recognized. The voice signal thus generated is output by way of the speaker 32.

In such a case, according to the present embodiment, whenever a voice is recognized by the voice recognition unit 10, the latitude/longitude data are supplied to the terminal 20a of the navigation apparatus 20 substantially at the same time as the character code data representing the recognized pronunciation is applied to the terminal 20b. The arithmetic circuit 23, however, first causes the voice synthesis circuit 31 to synthesize the recognized voice, and then causes the road map display data to be produced on the basis of the latitude/longitude data.

Figure 6:
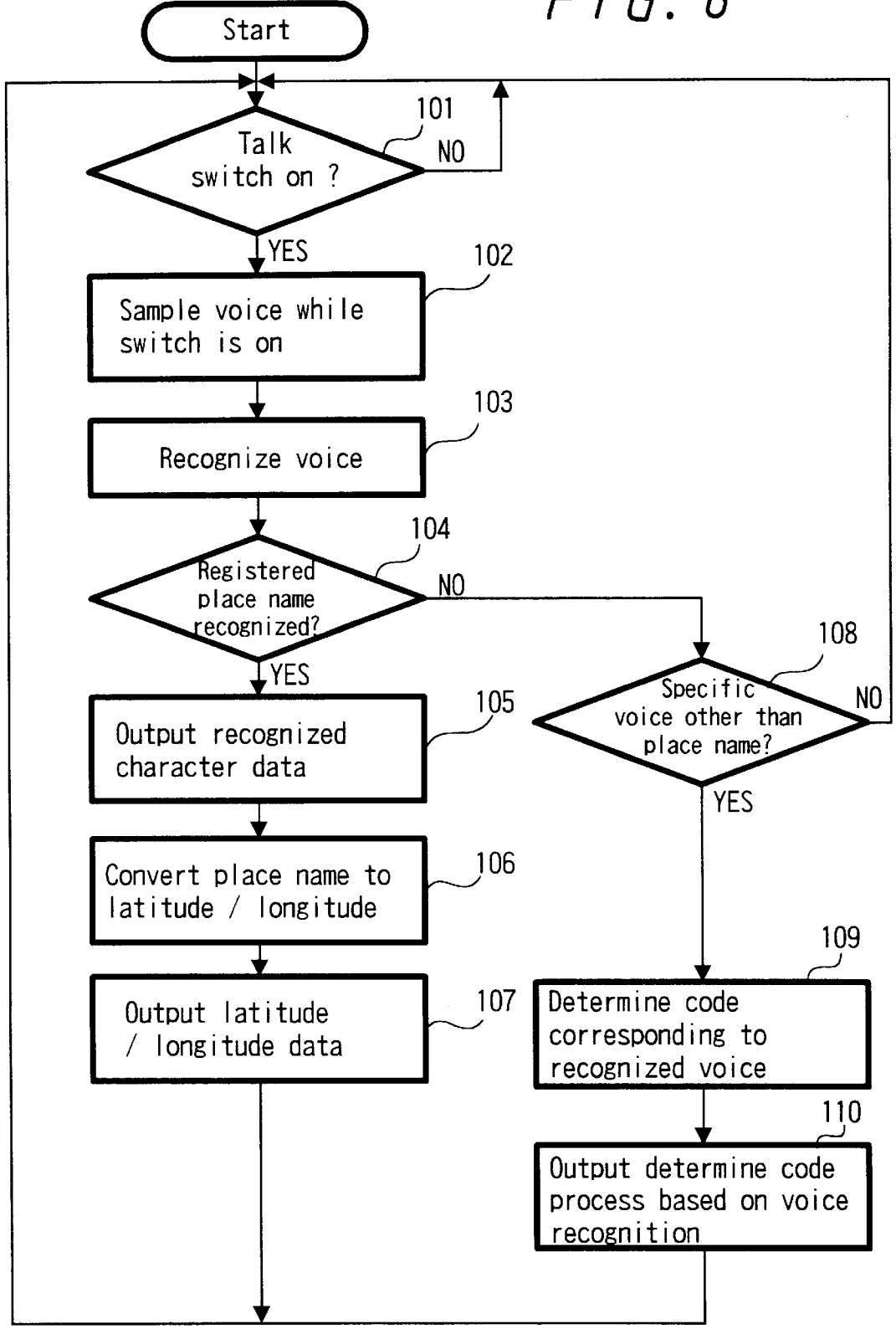
FIG. 6 is a flowchart showing the process based on voice recognition according to an embodiment.

Now, explanation will be made about displaying the road map using the voice recognition unit 10 and the navigation apparatus 20. First, the voice recognition operation of the voice recognition unit 10 will be described with reference to the flowchart of FIG. 6. The first step decides whether the talk switch 18 is on or not (step 101). In the case where the decision is that the talk switch 18 is on, the voice signal picked up by the microphone 11 during the on-time of the talk switch 18 is sampled by the analog/digital converter 12 and processed by the digital voice processing circuit 13 into vector data (step 102). On the basis of this vector data, the voice recognition circuit 14 performs the voice recognition process (step 103).

It is decided whether the voice of a place name stored in the voice recognition data storage ROM 15 (i.e., a place name registered in advance) has been recognized (step 104). In the case where the voice of a registered place name has been recognized, the character data for pronouncing the recognized place name is read out of the ROM 15 and output from the output terminal 10b (step 105). At the same time, the latitude/longitude data of the recognized place name are read from the latitude/longitude conversion data storage ROM 17 connected to the latitude/longitude conversion circuit 16 (step 106). The place names registered in the ROM 15 represent domestic prefectures and municipalities, and therefore the voices of a place name are recognized in the form of "xx City, xx Prefecture", "xx Ward, xx City" or the like (in the case under consideration, the ward name can be recognized even if the prefectural name is omitted).

The latitude/longitude data and incidental data read out on the basis of the recognized voice are output from the output terminal 10a (step 107).

In the case where step 104 is unable to recognize the voice of a registered place name, it is decided whether a registered specific voice other than the place name has been recognized or not (step 108). In the case where a registered specific voice other than the place name has been recognized, a character code corresponding to the recognized voice is determined (step 109), and the character code thus identified is output from the output terminal 10b (step 110).

In the case where even a specific registered voice other than a place name could not be recognized in step 108, the process is terminated. In such a case, an alternative is to notify the navigation apparatus 20 that the voice could not be recognized and to issue a warning by means of the voice synthesized on the voice synthesis circuit 31 or the characters displayed on the display unit 40.

Now, the operation of the navigation apparatus 20 will be explained with reference to the flowchart of FIG. 7. First, the arithmetic circuit 23 decides whether the present position display mode is set or not (step 201). In the case where the decision is that the present position display mode is set, the present position detecting circuit 22 is caused to execute the measurement of the present position (step 202). The road map data of the neighborhood of the present position thus measured is read from the CD-ROM (step 203). On the basis of the road map data thus read out, the process is performed for displaying the road map of the corresponding coordinate point on the display unit 40 (step 204).

In the case where the decision in step 201 is that the present position display mode is not set, or in the case where the process for display of the road map of the present position has been completed in step 204 and the road map is on display, then it is decided whether the latitude/longitude data, etc. are supplied from the voice recognition unit 10 through the input terminals 20a, 20b (step 205). In the case where the decision is that the latitude/longitude data and incidental character data or the like are supplied, the pronunciation character code supplied through the terminal 20b is supplied to the voice synthesis circuit 31, so that the voice recognized by the voice recognition unit 10 is synthesized and output from the speaker 32 (step 206). The road map data of the neighborhood of the position indicated by the latitude/longitude data is then read out of the CD-ROM (step 207). On the basis of the road map data thus read out, the road map display process is performed thereby to display the road map of the corresponding coordinate point on the display unit 40 (step 208).

In the case where the decision in step 205 is that the latitude/longitude data are not supplied from the voice recognition unit 10, or in the case where the process for displaying the road map of a designated place name is complete in step 208, and the road map is on display, on the other hand, it is decided whether the character code directly specifying a display position is supplied from the voice recognition unit 10 through the input terminal 20b (step 209). In the case where the decision is that the character code is supplied from the terminal 20b, the particular character code is supplied to the voice synthesis circuit 31, and the voice recognized by the voice recognition unit 10 is output from the speaker 32 (step 210). In the case where step 209 identifies a character code directly specifying the display position (i.e., such words as "destination", "starting point", "intermediate place", "residence" or the like), it is decided whether the coordinate point specified by these characters is registered in the RAM 25 or not (step 211). In the case where such coordinate point is registered, the road map data of the neighborhood of the position indicated by the latitude/longitude data representing the registered coordinate point is read from the CD-ROM (step 212). The process for displaying the road map is performed on the road map data thus read out, and the road map of the corresponding coordinate point is displayed on the display unit 40 (step 213). The process returns to step 201 while the same road map is on display.

In the case where step 209 decides that the character code directly specifying the display position is not supplied from the voice recognition unit 10, the arithmetic circuit 23 decides whether the operation is performed for specifying the display position by the operating key 27 (step 214). In the case where the operation is performed for specifying the display position, it is decided whether the vehicle is moving or not on the basis of the data detected by the vehicle speed sensor 26 (step 215). In the case where the arithmetic circuit 23 decides that the vehicle is moving, the operation performed at that time is invalidated and the process returns to step 201 (in which case some alarm may be issued).

In the case where the decision is that the vehicle is not moving, on the other hand, the process proceeds to step 211 for deciding whether a coordinate point is registered or not. In the case where a coordinate point is registered, the process is performed for displaying the road map of the coordinate point (steps 212, 213), after which the process returns to step 201.

In the case where step 211 decides that the coordinate point of the corresponding position such as "destination", "starting point", "intermediate place" or "residence" is not registered, an alarm is issued against the lack of registration by voice synthesis through the voice synthesis circuit 31 or by character display on the display unit 40 (step 216), and the process returns to the decision in step 201.

Figure 7:
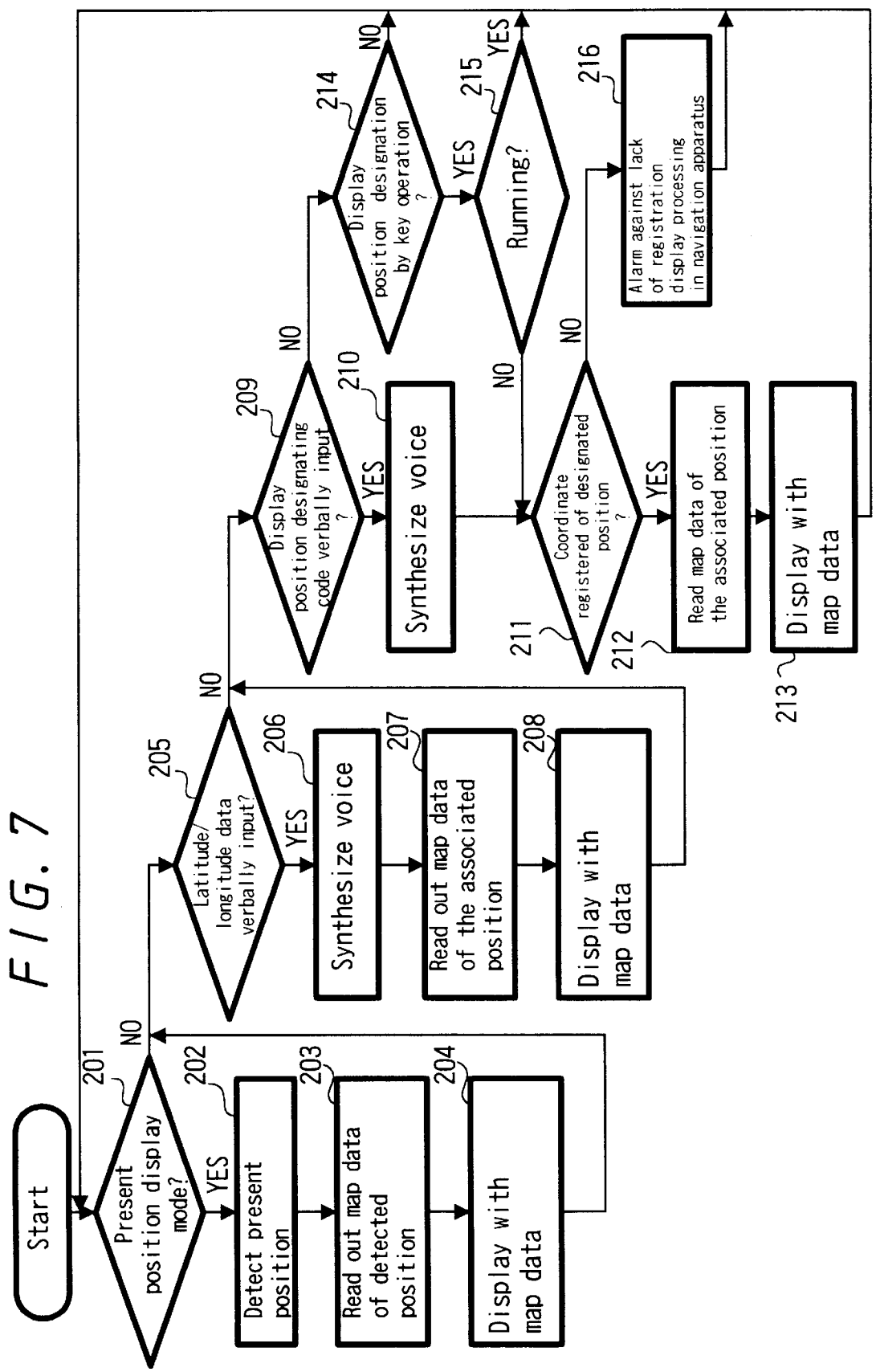
FIG. 7 is a flowchart showing the display process of the navigation apparatus according to an embodiment.

The foregoing explanation with reference to the flowchart of FIG. 7 refers to the process relating to map display. In the case where a character code is supplied from the voice recognition unit 10 based on the result of recognizing a voice specifying an operation other than map display, however, the corresponding process is performed under the control of the arithmetic circuit 23. When the character code is supplied upon recognition of a voice meaning "What time is it now?", for example, a voice announcing the present time is synthesized by the voice synthesis circuit 31 and output from the speaker 32 under the control of the arithmetic circuit 23. Other commands are also processed similarly as a verbal reply synthesized by the voice synthesis circuit 31 and output from the speaker 32, or by a corresponding display on the display unit 40.

Figure 8:
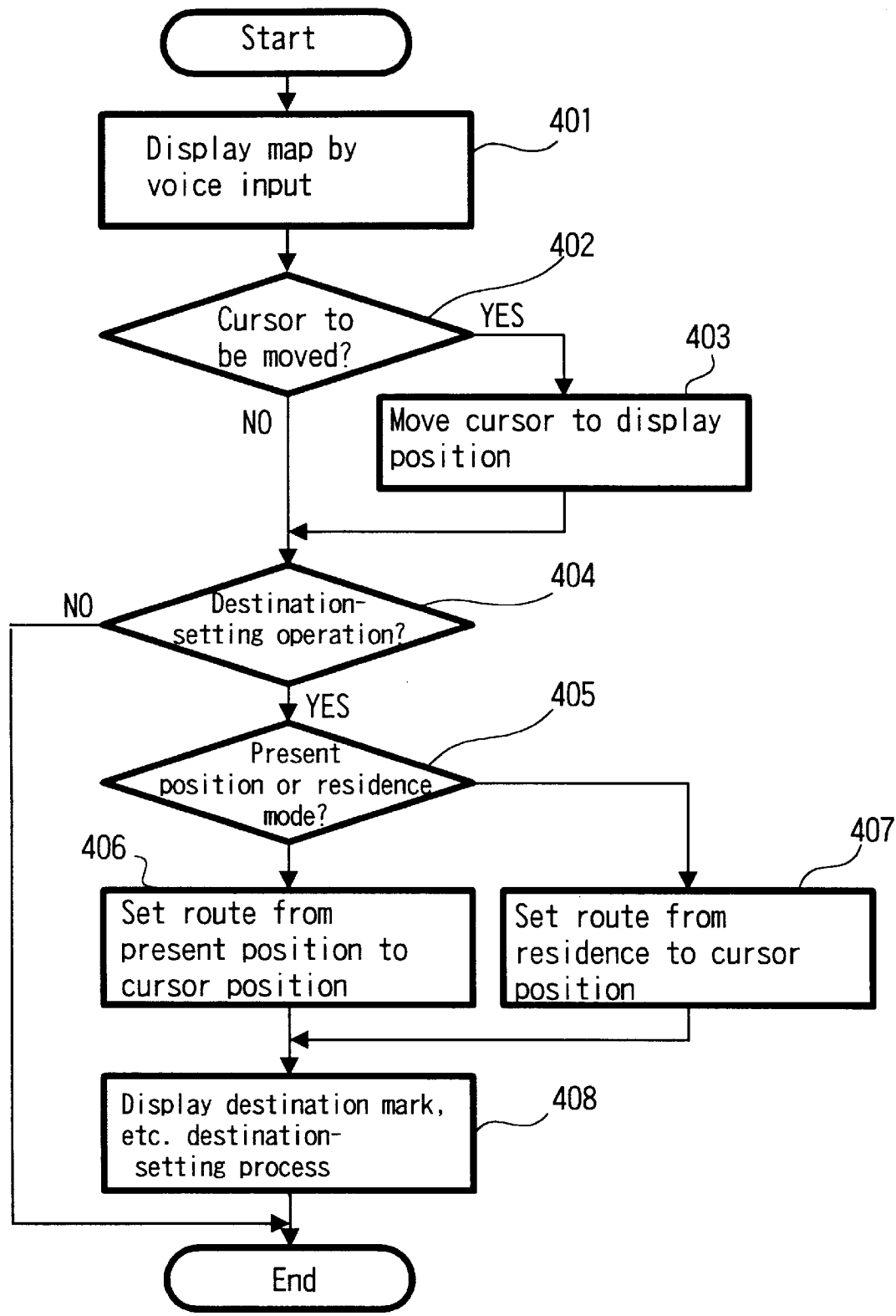
FIG. 8 is a flowchart showing the destination-setting process according to an embodiment.

The process in which a destination is set on the road map on display by means of the voice recognition unit 10 and the navigation apparatus 20 according to this embodiment will be explained with reference to the flowchart of FIG. 8.

Figure 9A:
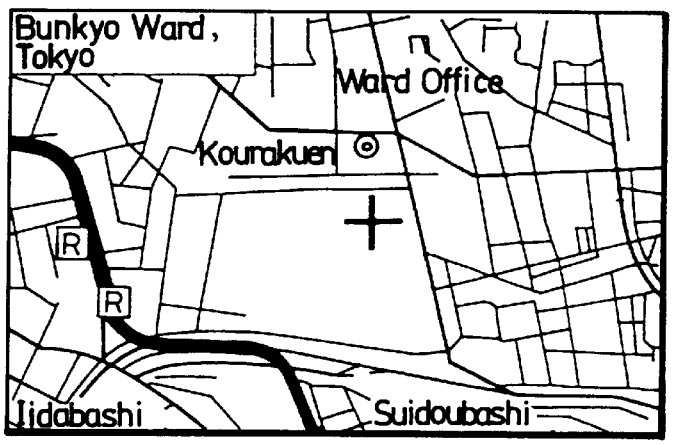
FIGS. 9A and 9B is a diagram for explaining an example display of the destination according to an embodiment.

First, an input voice is recognized, and the road map of the place name recognized is displayed on the display unit 40 (step 401). When this map display is started, the cursor display position is set at the center of the map. As shown in FIG. 9A, for example, the cross indicating the cursor position is displayed at the center of the map.

It is decided whether the key is operated to move the cursor position from this state (step 402). When the operation for moving the cursor position is performed, the cursor display position is moved in the direction designated by the operation (step 403).

The next decision is whether the operation is performed for setting a destination (or whether a verbal instruction is issued for setting a destination) (step 404). In the case where the operation is performed for setting a destination, it is decided whether the route setting mode is for setting the route from the present position (present position mode) or from a position registered as the residence (residence mode) (step 405). In the present position mode, the present position measured by the positioning operation is determined, so that the arithmetic operation is performed for setting the route from this present position to the cursor position (step 406). In the residence mode, on the other hand, a position registered as a private residence is determined, and the arithmetic operation is performed for setting the route from the position thus determined to the cursor position (step 407).

Figure 9B:
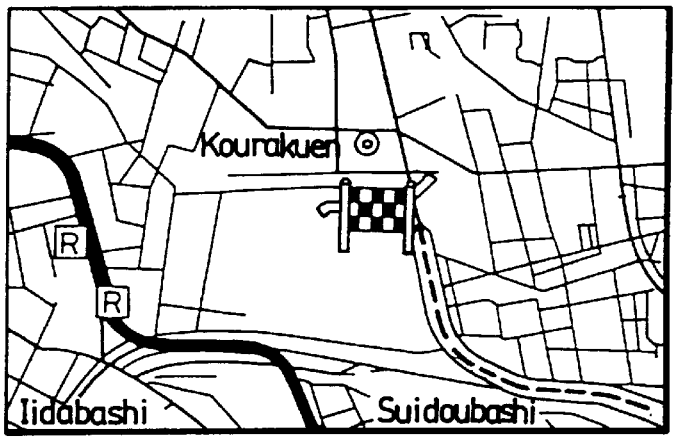

In either mode, a mark indicating a destination is displayed at a position set as the destination in the map on display. At the same time, in the case where the map contains the road selected as the route, the particular route is displayed (step 408). As shown in FIG. 9B, for example, a flag is displayed at the position set as the destination, and the road set as the route to the destination is displayed by a thick dashed line. This display process terminates the destination-setting process.

The display process performed as described above can freely set by voice input a display position in any part of the country, thereby making it possible to display the road map of the desired position easily. More specifically, the operator can simply speak "xx City, xx Prefecture" or "xx Ward, xx City" by way of the microphone 11 while depressing the talk switch 18. Then, the particular voice is recognized and the road map of the area is displayed. The position designation by key operation, therefore, is eliminated. Even under the circumstances where the complex key operation is difficult, the navigation apparatus can be operated smoothly. According to this embodiment, the verbal expressions indicating place names recognizable by the voice recognition unit 10 are limited to the names of domestic prefectures and municipalities. Therefore, only a comparatively small number (about 3500) of voices can be recognized. As a result, the voice recognition circuit 14 in the voice recognition unit 10 can recognize a place name by a voice recognition process comparatively small in capacity and in time. The time before a verbally designated map is displayed can be reduced. At the same time, the recognition rate is improved by limiting the number of recognizable place names in this way.

According to this embodiment, a destination is set by the cursor position on the map on display, and therefore the route to a destination can be set by simple operation. More specifically, the conventional route-setting method in the route setting mode requires a complicated operation for setting the coordinate points of the starting point and the destination. In this embodiment, by contrast, a destination can be set on the displayed map simply by the key operation or the voice recognition operation. In this case, the starting point is determined either at the present position or at the private residence or the like registered in advance. The route can thus be set automatically from the present position or the registered position simply by setting the destination in either mode.

In this way, a desired destination can be set by an instruction according to voice recognition on the map selectively displayed by voice recognition. Therefore, the route can be set very easily by verbal instructions alone.

According to this embodiment, the coordinate point data corresponding to the place names stored in the ROM 17 of the voice recognition unit 10 include the latitude/longitude data indicating the absolute position of each municipal office (city office, ward office, town office or village office) of a particular area. Therefore, the map centered around the municipal office of a particular area is displayed conveniently. This is the most desirable mode of display since the municipal office of each area is often located at the center of the area.

In the above-mentioned embodiment, the place names recognized by the voice recognition unit are limited to those of the prefectures and other municipalities in Japan. The voice can be recognized, however, specifying more detailed place names or positions. In other words, the name of a building which is likely to provide a target and an address by which the exact position can be specified may also be recognized directly by voice, so that the destination may be specified as a position designated by the recognized voice. Examples are "Tokyo Station", "Tokyo Tower" and other station or facility names.

Further, instead of setting the latitude/longitude data indicating the absolute position of a municipal office (city office, ward office, town office or village office) of a particular area as the central coordinate point for each place name, the latitude/longitude data indicating other positions may be used alternatively. A simple example is the latitude/longitude data of the geological center of a particular area (city, ward, town or village).

Furthermore, the latitude/longitude data of the geographical center of an area may be replaced by the coordinate point data of the eastern, western, northern and southern ends of the particular area. In such a case, four data including the longitudes of the eastern and western ends and the latitudes of the northern and southern ends are stored to serve the purpose.

In the above-mentioned embodiment, the recognized voice is converted into a character code and then this character code is converted into the latitude/longitude data by the latitude/longitude conversion circuit 16. Instead, the recognized voice may be directly converted into the latitude/longitude data. Even in the case where the recognized voice is not directly converted into the latitude/longitude data, the ROM 15 and the ROM 17 for storing the conversion data may be integrated as a single memory to share a place name storage area.

The above-mentioned embodiment, which is applied to the navigation apparatus using a positioning system called the GPS, can of course be applied to the navigation apparatus using other positioning systems with equal effect.

The navigation apparatus according to this invention can set a destination in simple fashion on the map on display.

In view of the fact that a destination is set on the road map displayed under the control of a voice recognized by the voice processing means, the mere voice makes a search possible for a destination map to be displayed, thereby greatly facilitating the destination-setting work of the user.

Also, since the route up to a set destination is determined from the present position measured by the positioning means as the origin, the work for setting the route from the present position to the destination is greatly facilitated.

Alternatively, the route to a destination is set from a specified position as the origin. This simplifies the setting of the route from a predetermined position such as a private residence.

Furthermore, a destination can be easily set on the displayed map by the navigation method according to the invention.

In this case, since a destination is set on the road map displayed under the control of a recognized voice, verbal search is possible for a destination map to be displayed, thereby greatly facilitating the destination-setting work.

In addition, a route from the present position to a destination can be easily set because the present position measured is used as the origin for setting the route to the destination.

What is more, in view of the fact that a route to a set destination is determined with a predetermined specific position as the origin, the route can be set easily from a predetermined position such as a private residence.

Furthermore, in an automotive vehicle according to this invention, a destination can be easily set in the map on display. Even in the circumstances where the complex key operation is difficult in a running vehicle, simple processes including voice recognition permit a destination to be set. The operation of the navigation apparatus in a running vehicle can thus be simplified while at the same time securing safety.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. Navigation apparatus for use within a vehicle, the apparatus comprising:

recognition means mounted within the vehicle for recognizing a voice signal, said recognition means including a directional microphone constructed and mounted to detect speech preferentially from a user of the apparatus situated at a predetermined location within the vehicle, said predetermined location being selected from the group consisting of a plurality of locations within the vehicle;

a voice recognition data memory for storing character data including place names, operation commands, and information relating to frequently mistaken place names, for allowing said recognition means to match said voice signal with said character data; and a conversion data memory for storing longitude/latitude data and incidental data including display scale data corresponding to each place name stored in said voice recognition data memory, display means for displaying a map of at least one of said place names in a predetermined display scale, and route search means for setting a predetermined position in said map being displayed as a destination point in response to a predetermined operation by the user or a recognized signal that is matched with one of said place names stored in said voice recognition data memory and converted to lonqitude/latitude data and incidental data stored in said conversion data memory, and for searching for a route on said map to said destination point, wherein said voice signal recognized by said recognition means includes a navigational command or one of said operation commands.

2. The navigation apparatus as claimed in claim 1 further comprising:

position detection means for detecting a present position of the user, wherein said route search means includes means for searching for said route from a predetermined point to the destination point.

3. The navigation apparatus as claimed in claim 1 wherein;

said route search means includes means for searching for said route from a predetermined point to the destination point.

4. The navigation apparatus as claimed in claim 1 wherein said display means includes means for displaying a predetermined mark on the displayed destination point in the map and a predetermined marking on the searched route in the map.

5. A method of navigating a vehicle, the method comprising:

a recognition step for preferentially recognizing a voice of a user situated at a predetermined location within the vehicle, said predetermined location being selected from the group consisting of a plurality of locations within the vehicle, a matching step for matching said voice with character data stored in a voice recognition data memory, said character data including place names, operation commands, and information relating to frequently mistaken place names, a converting step for converting said place names into longitude/latitude data and incidental data including display scale data by looking said place names up in a conversion data memory, a display step for displaying a map of at least one of said place names in a predetermined display scale, a setting step for setting a predetermined position in the displayed map as a destination point in response to a predetermined operation by the user or in response to the recognized voice that is matched with one of said place names stored in said voice recognition data memory and converted to longitude/latitude data and incidental data stored in said conversion data memory, and a searching step for searching for a route on said map to said destination point, wherein said voice recognized in said recognition step includes a navigational command or one of said operation commands.

6. The navigation method as claimed in claim 5 wherein; said destination point setting operation is executed by voice.

7. The navigation method as claimed in claim 5 wherein; said destination point is a name of a specific place.

8. The navigation method as claimed in claim 5 wherein; a starting command of said searching step is executed by voice.

9. The navigation method as claimed in claim 5 further comprising:
   a position detection step for detecting a present position of the user, wherein
   said searching step searches for said route from the present position to the destination point.

10. The navigation method as claimed in claim 5 wherein:
    said searching step searches for said route from a given starting position to the destination point.

11. The navigation method as claimed in claim 5 further comprising the steps of displaying a predetermined mark on the displayed destination point in the map and displaying a predetermined marking on the searched route in the map.

12. A car with a navigation apparatus comprising:
    directional microphone means constructed and mounted inside said car to detect preferentially speech of a user of the apparatus situated at a predetermined location within the car, said predetermined location being selected from the group consisting of a plurality of locations within the car,
    recognition means for recognizing a voice detected by said microphone means, said recognition means including
      a voice recognition data memory for storing character data including place names, operation commands, and information relating to frequently mistaken place names, for allowing said recognition means to match said voice with said character data; and
      a conversion data memory for storing longitude/latitude data and incidental data including display scale data corresponding to each place name stored in said voice recognition data memory;
    display means located inside said car for displaying a map of at least one of said place names in a predetermined display scale, and
    route search means for setting a predetermined position as a destination point in said map being displayed in response to a predetermined operation by the user or a voice detected by said microphone means that is matched with one of said place names stored in said voice recognition data memory and converted to longitude/latitude data and incidental data stored in said conversion data memory, and for searching for a route to said destination point,
    wherein said voice recognized by said recognition means includes a navigational command or one of said operation commands.

13. The car as claimed in claim 12 further comprising:
    position detection means for detecting a present position of the car, wherein
    said route search means searches for the route from the detected present position of the car to the destination point.

14. The car as claimed in claim 12 wherein;
    said route search means searches for the route from a predetermined point to the destination point.

15. The car as claimed in claim 12 wherein said display means includes means for displaying a predetermined mark on the display destination point in the mark and means for displaying a predetermined marking on the searched route in the map.

* * * * *